United States Patent
Watanabe et al.

[19]

[11] Patent Number: 6,161,427
[45] Date of Patent: Dec. 19, 2000

[54] VEHICLE ACCELERATION DETECTOR

[75] Inventors: Akira Watanabe, Fujisawa; Kazutaka Adachi, Yokohama, both of Japan

[73] Assignee: Nissan Motor Co., Ltd., Yokohama, Japan

[21] Appl. No.: 09/127,465

[22] Filed: Jul. 31, 1998

[30] Foreign Application Priority Data

| Aug. 1, 1997 | [JP] | Japan | 9-208071 |
| Aug. 11, 1997 | [JP] | Japan | 9-216363 |
| Aug. 11, 1997 | [JP] | Japan | 9-216364 |

[51] Int. Cl.$^7$ ................................. G01L 3/26
[52] U.S. Cl. .................................. 73/117.3; 73/118.1
[58] Field of Search .................. 73/117.3, 118.1; 340/467, 438

[56] References Cited

U.S. PATENT DOCUMENTS 4,752,883  6/1988  Asakura et al. .............. 73/117.3
5,589,817  12/1996  Furness ....................... 340/467

FOREIGN PATENT DOCUMENTS 8-15312  1/1996  Japan.

*Primary Examiner*—Benjamin R. Fuller
*Assistant Examiner*—Maurice Stevens
*Attorney, Agent, or Firm*—Foley & Lardner

[57] ABSTRACT

A rotation pulse signal is generated according to a vehicle speed sensor. An acceleration detector calculates a threshold value of a pulse cycle on a subsequent occasion based on a latest pulse cycle and an acceleration which it is desired to detect. By comparing the pulse period on the subsequent occasion with the threshold value, it is determined whether or not a specified acceleration has been reached. After this determination, a threshold value for the subsequent occasion is calculated. By detecting whether the specified acceleration has been reached without calculating an acceleration value, the time from output of the pulse signal to detection of the specified acceleration is shortened.

18 Claims, 16 Drawing Sheets

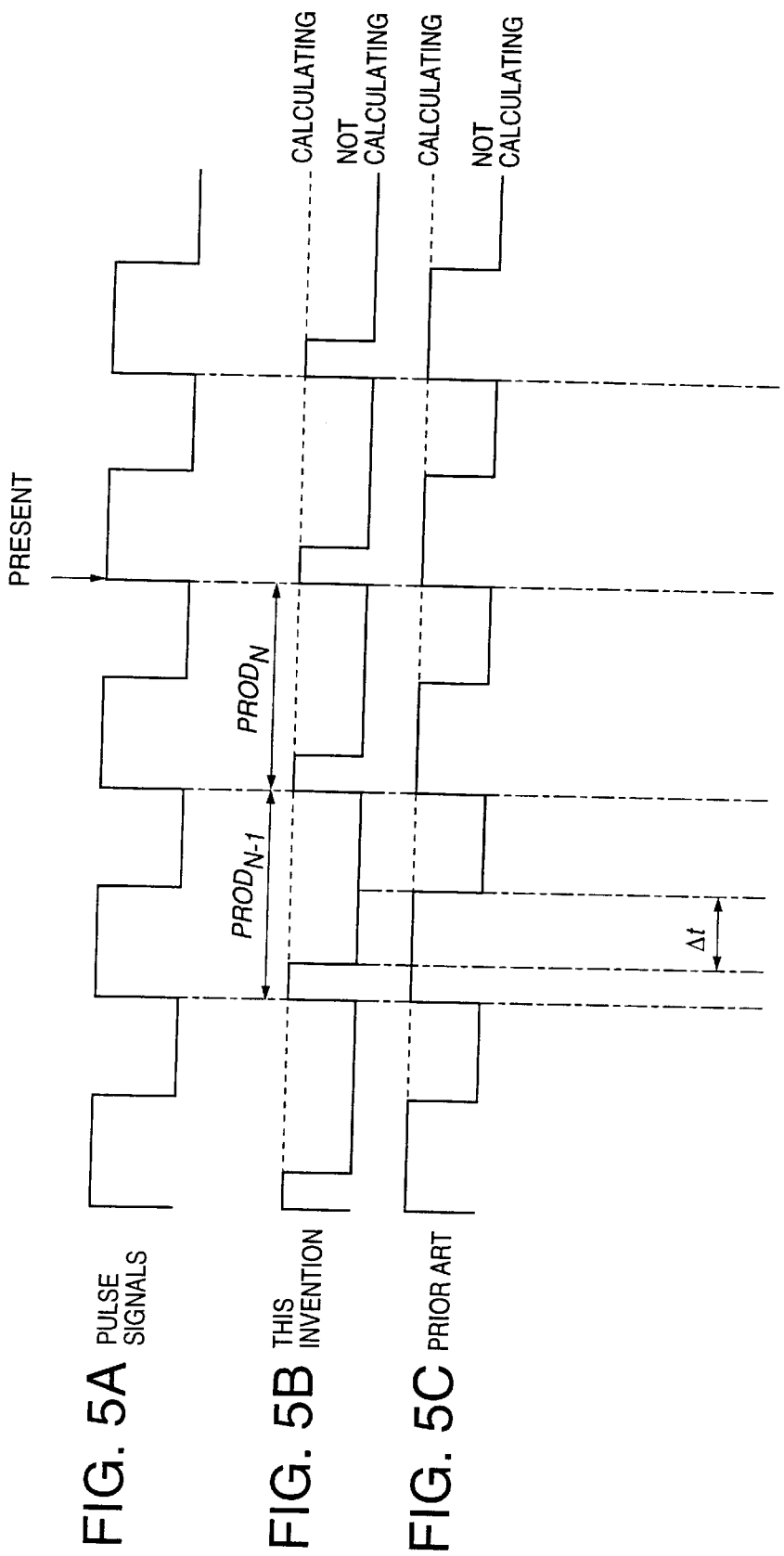

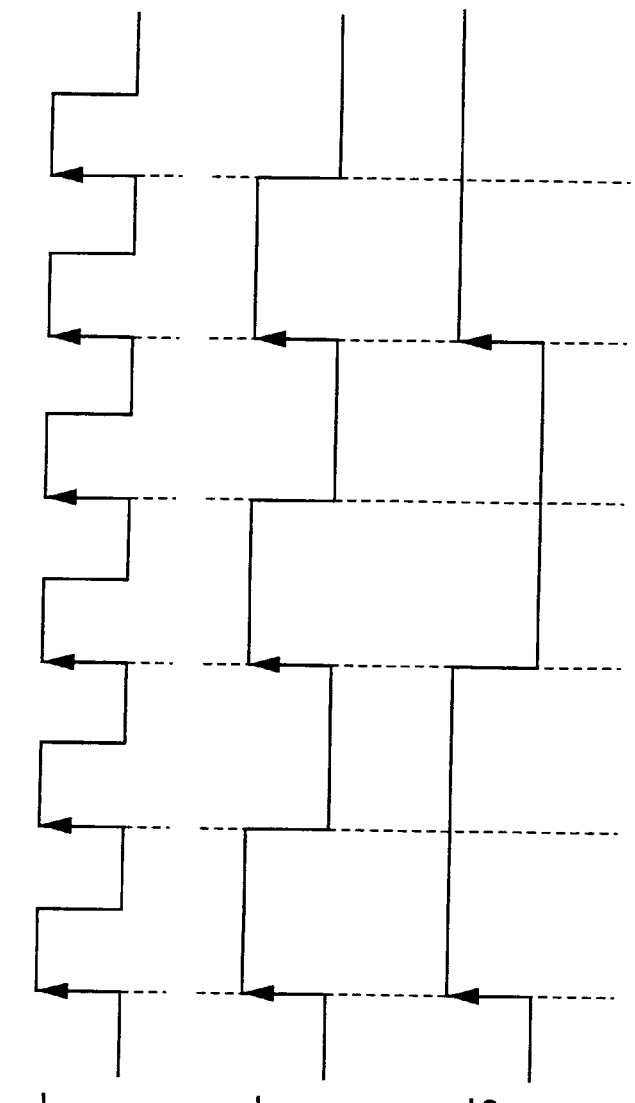

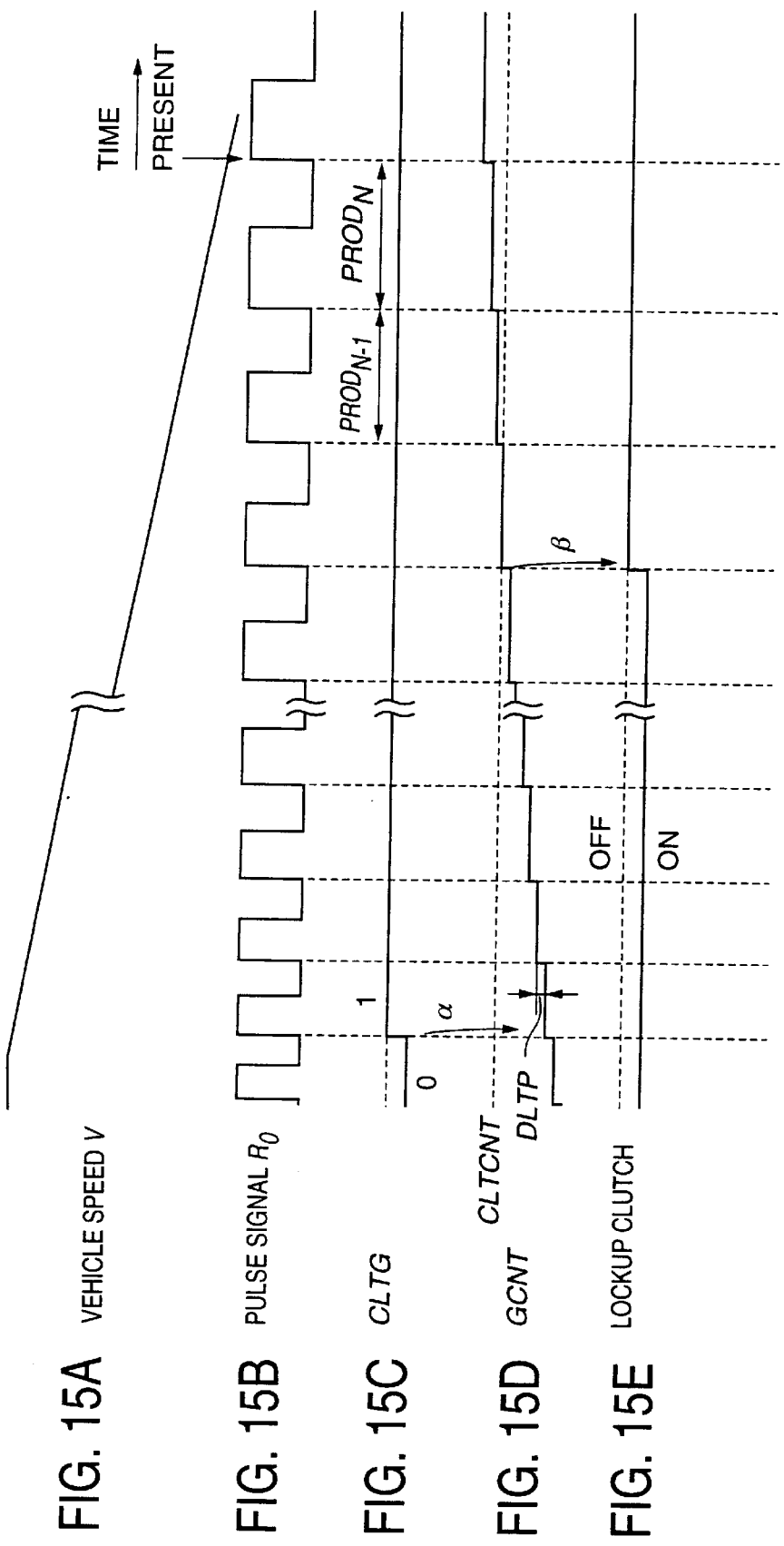

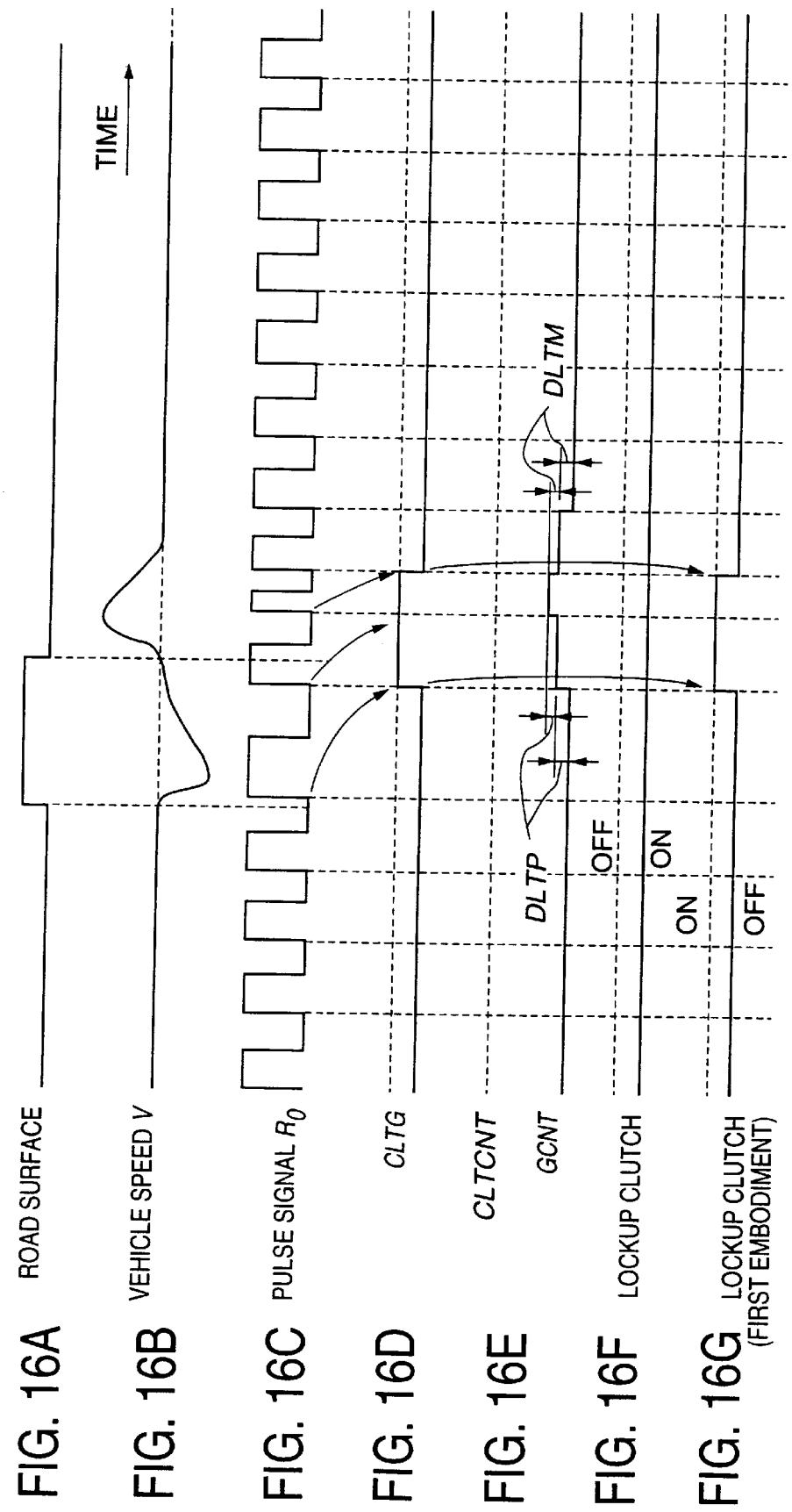

VEHICLE ACCELERATION DETECTOR

FIELD OF THE INVENTION

This invention relates to a device for detecting that an acceleration/deceleration of a vehicle has reached a predetermined value.

BACKGROUND OF THE INVENTION

A device for detecting the acceleration of a vehicle is disclosed for example, in Tokkai Hei 8-15312 published by the Japanese Patent Office in 1996. In this device, a forward/backward acceleration of the vehicle is found based on the period of a pulse signal emitted in a given interval by a vehicle speed sensor. This device measures the time required to count the past n pulse signals. A difference between this required time and the time required to count the preceding n pulse signals measured in the same way is calculated, and the acceleration of the vehicle is found by multiplying this difference by a predetermined coefficient. n may for example be set equal to the number of pulses generated per one rotation of a pulse generating rotor of the vehicle speed sensor in one minute.

Since the deceleration of the vehicle is expressed as negative acceleration, it should be noted that the term acceleration in the following expression involves deceleration.

In the above device, the pulse signal is a rectangular wave, and the acceleration is calculated by performing the above measurement each time the edge of the pulse signal, i.e. the appearance of the signal, is detected. This calculation must be performed before the next pulse signal is output. Since this calculation contains a multiplication that takes time, a microprocessor of high performance must be used so that the calculation is performed even at high vehicle travel speeds when the pulse signal interval is short.

The vehicle speed sensor for example comprises a digital rotation sensor. This comprises a pulse generation rotor comprising a gear with teeth or a disc with holes rotating at a speed in proportion to the vehicle speed, and an optoelectric element that generates a pulse signal every time when a tooth or hole passes by. Such a sensor is known from Tokkai Hei 8-15312 published by the Japanese Patent Office in 1996.

In such a vehicle speed sensor, the number of pulse signals increases at high vehicle speeds and the load on a microprocessor performing the acceleration calculation increases. When the vehicle speed is extremely high, the time required for calculation exceeds the interval of the pulse signal, and the correct detection of acceleration becomes difficult. A high performance microprocessor must therefore be used.

In a vehicle using a torque converter with a lockup clutch, there is a possibility that the engine may stall when the vehicle suddenly decelerates while the lockup clutch is engaged. Therefore, the lockup clutch must be released when for example, the deceleration of the vehicle reaches a predetermined value so as to prevent this engine stall.

In this case, the data necessary for operation of the lockup clutch concern whether or not the deceleration of the vehicle reached the predetermined value, the actual value of the deceleration itself being unnecessary.

However, when the vehicle speed sensor of the aforesaid prior art is used for the above-mentioned determination, first, the value of the deceleration is calculated, and is then compared with the predetermined value. Therefore even in an acceleration detector applied to such a use, a high performance microprocessor is required to obtain a precise result when the vehicle speed is high.

On the other hand, engine stall generally occurs during rapid deceleration from a low rotation speed, and does not easily occur during rapid deceleration at high rotation speed. It is therefore unnecessary to release lockup to prevent engine stall in the high vehicle speed region. In other words, even if a high performance microprocessor is used for the detection of acceleration, when the vehicle speed is high.

Also, when a vehicle runs on an uneven road, the microprocessor may determine that a set deceleration for releasing lockup was achieved. However, the variation of the vehicle speed due to unevenness of the road surface is actually only a noise component and therefore it should not be taken into consideration to determine whether or not the lockup clutch is released.

SUMMARY OF THE INVENTION

It is therefore an object of this invention to shorten the time required to calculate a specified acceleration of a vehicle using a vehicle speed sensor.

It is a further object of this invention to suppress the calculation load of a microprocessor when a specified acceleration of the vehicle is detected using a vehicle speed sensor.

It is yet a further object of this inv ention to remove a noise comp one nt in the detection of a specified acceleration using a vehicle speed sensor.

In order to achieve the above objects, this invention provides a vehicle acceleration detector comprising a vehicle speed sensor which periodically generates a pulse signal corresponding to a vehicle speed and a microprocessor.

The microprocessor is programmed to calculate a threshold value corresponding to a subsequent cycle of the pulse signal based on a latest cycle of the pulse signal and a specified acceleration, and perform a determination as to whether or not a vehicle acceleration has reached a specified acceleration based on a comparison of said threshold value and the cycle of the pulse signal detected on a subsequent occasion.

When the vehicle comprises a drive wheel, it is preferable that the microprocessor is further programmed to convert the cycle of the latest pulse signal to a travel distance of the drive wheel, and calculate the threshold value from the travel distance and the specified acceleration.

It is further preferable that the microprocessor comprises a map specifying a relation between the cycle of the pulse signal and the threshold value, and is further programmed to calculate the threshold value by referring to the map based on the cycle of the latest pulse s ignal.

It is still further preferable that the microprocessor comprises a plurality of the maps set according to the specified acceleration, and is further programmed to change over a map used for calculating the threshold value according to the specified acceleration.

It is also preferable that the detector further comprises a device for detecting whether or not the vehicle brakes are operating, and the microprocessor is further programmed not to perform the determination when the brakes are not operating.

This invention also provides a vehicle acceleration device comprising a vehicle speed sensor which periodically generates a pulse signal representative of a vehicle speed, and a microprocessor programmed to perform a determination as to whether or not a vehicle acceleration has reached a specified acceleration based on a cycle of the pulse signal, detect a vehicle speed from the cycle of the pulse signal, determine whether or not the vehicle speed is larger than a predetermined value, and refrain from performing the determination based on a specified pulse signal of the pulse signals when the vehicle speed exceeds the predetermined value.

The specified pulse signal may corresponds to all the pulse signals generated by the vehicle speed sensor.

Alternatively, the microprocessor may be programmed to divide a frequency of the pulse signal by a predetermined division number, and to set a pulse signal excluded by division to the specific pulse signal.

In this case, it is further preferable that the microprocessor is further programmed to increase the division number as the vehicle speed increases.

When the vehicle comprises a propeller shaft, it is preferable that the vehicle speed sensor comprises a sensor for generating a pulse signal having a. fixed relation with a rotation speed of the propeller shaft.

When the vehicle comprises an engine and a transmission joined to the engine, it is preferable that the vehicle speed sensor comprises a crank angle sensor for generating a pulse signal having a fixed relation with a rotation angle of the engine and a sensor for detecting a real speed change ratio of the transmission, and the microprocessor is further programmed to generate the pulse signal representative of the vehicle speed by dividing the pulse signal of the crank angle sensor by the real speed change ratio.

This invention also provides a vehicle acceleration detector comprising a vehicle speed sensor which periodically generates a pulse signal corresponding to a vehicle speed, and a microprocessor programmed to set a predetermined counter value, determine whether or not a vehicle acceleration has reached a specified acceleration based on a cycle of the pulse signal, add a first predetermined amount to the counter value when the acceleration of the vehicle has reached the specified acceleration, subtract a second predetermined amount from the counter value when the acceleration of the vehicle has not reached the specified acceleration, and output a signal specifying that the vehicle acceleration has reached the specified acceleration when the counter value is equal to or greater than a predetermined upper limit.

Herein, both of the first predetermined amount and the second predetermined amount may be set to negative values.

It is preferable that the microprocessor is further programmed to calculate a threshold value corresponding to a subsequent cycle of the pulse signal based on a latest period of the pulse signal and the specific acceleration, and to determine whether or not the acceleration of the vehicle has reached the specified acceleration based on a comparison of the threshold value and the cycle of the pulse detected on a subsequent occasion.

When the vehicle comprises drive wheels, it is further preferable that the microprocessor is further programmed to calculate the threshold value by the following equation:

$$CLTPROD = \frac{-V_0^2 + \sqrt{V_0 + 2 \cdot G_C \cdot Dp1}}{G_C}$$

-continued $$V_0 = \frac{K \cdot Dp1}{t_0}$$

where, CLTPROD=threshold value,

DP1=rotation distance of drive wheels 5 corresponding to pulse cycle of vehicle speed sensor 3, $t_0$=latest pulse cycle of vehicle speed sensor 3, $V_0$=latest vehicle speed, $G_C$=specific acceleration which it is intended to detect, and K=positive integer.

It is also preferable that both the first predetermined amount and second predetermined amount are set to positive values, and the first predetermined amount is set less than the second predetermined amount.

The details as well as other features and advantages of this invention are set forth in the remainder of the specification and are shown in the accompanying drawings.

BRIEF DESCRIPTION OF THE DRAWINGS

FIGS. 5A–5C are timing charts showing a relation between a vehicle speed pulse signal and an execution time of a deceleration determining process.

FIGS. 12A–12C are timing charts for describing a pulse signal after frequency division according to the fourth embodiment.

FIGS. 15A–15E are timing charts describing an example of specified deceleration detection according to the fifth embodiment.

FIGS. 16A–16G are timing charts describing an example of noise removal according to the fifth embodiment.

DESCRIPTION OF THE PREFERRED EMBODIMENTS

Figure 1:
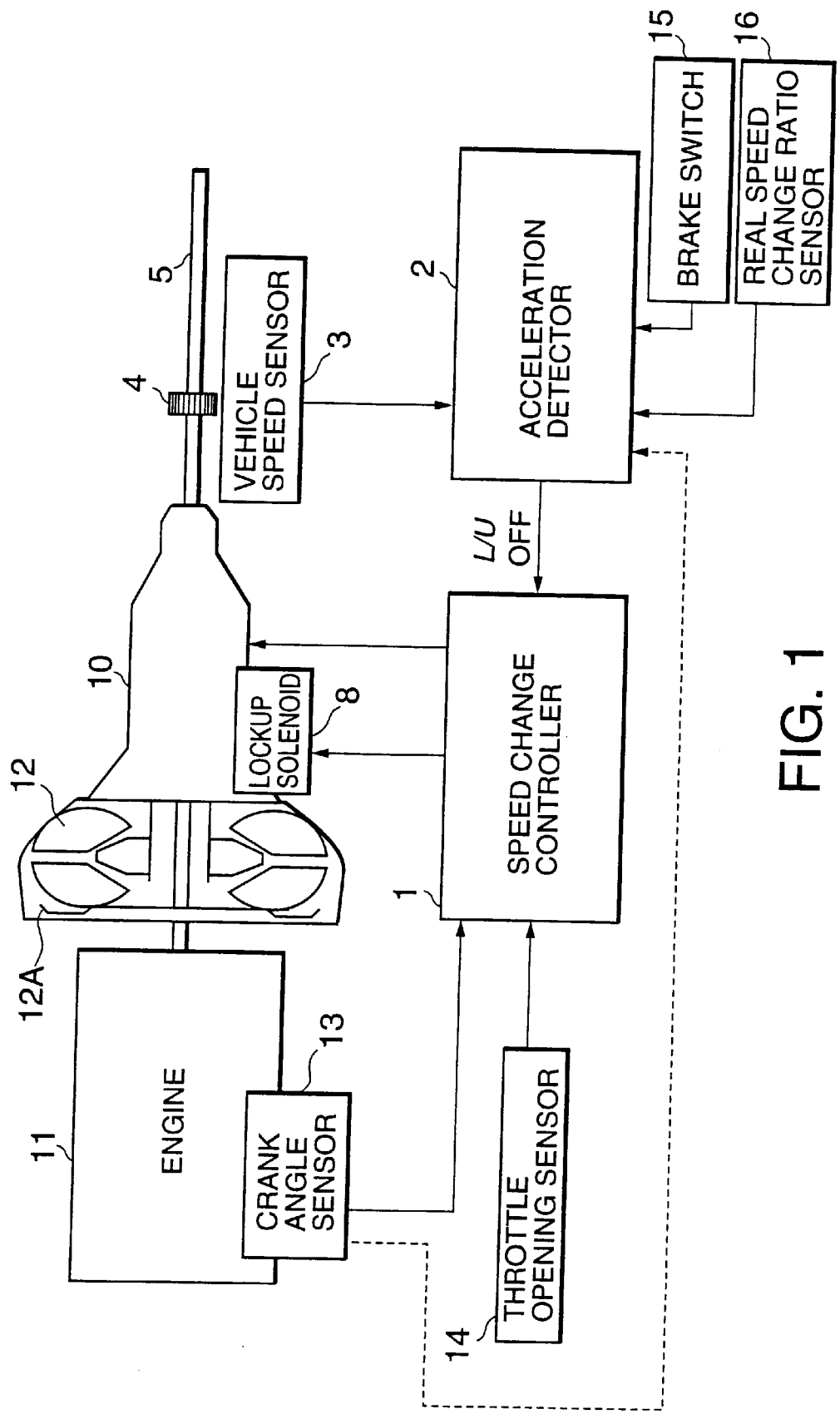
FIG. 1 is a schematic diagram of an automatic transmission device for a vehicle comprising an acceleration detector according to this invention.

Referring to FIG. 1 of the drawings, a torque converter 12 is interposed between an engine 11 for a vehicle and an automatic transmission 10. The torque converter 12 comprises a lockup clutch 12A which directly connects the engine 11 with the automatic transmission 10. The lockup clutch 12A is engaged by energizing a lockup solenoid 8.

The automatic transmission 10 is control led by a speed change controller 1 comprising a microcomputer, and energizing of the lockup solenoid 8 is also controlled by the speed change controller 1.

Signals from an acceleration detector 2 which determines release of the lockup clutch 12A, crank angle sensor 13 which detects engine rotation speed Ne and throttle open ing sensor 14 for detecting a throttle opening TVO are input to the speed change controller 1. The speed change controller 1 performs setting of a gear position of the automatic transmission 10 and control of the lockup clutch 12 according to a vehicle speed V.

Describing the control of the lockup clutch 12A, the speed change controller 1 looks up a duty ratio of power supplied to the lockup solenoid 8 from a previously stored lockup control map based on vehicle running conditions such as throttle opening TVO and vehicle speed V. Engaging and release cf the lockup clutch 12A are performed by controllin energization to the lockup solenoid 8 according to this duty ratio.

The acceleration detector 2 senses a rapid deceleration which would cause the vehicle drive wheels to lock and the engine 11 to stall, according to a process described hereafter from a signal output by the vehicle speed sensor 3, and outputs a lockup release signal to the speed change controller 1. For this purpose, the acceleration detector 2 comprises a microcomputer comprising a central processing unit, read only memory, random-access memory and I/O interface.

The speed change controller 1 modifies the duty ratio of power supplied to the lockup solenoid 8 according to the input of the lockup release signal, thereby releasing the lockup clutch 12A.

The vehicle speed sensor 3 faces a gear 4 fixed on a propeller shaft 5 joined to an output shaft of the automatic transmission 10. The vehicle speed sensor 3 comprises a magnetic pickup, and outputs a pulse signal each time one of the teeth formed at equidistant intervals in the gear 4 passes.

The acceleration detector 2 detects the rotation speed of a propeller shaft 5 from a time cycle PROD of the pulse signal. The rotation speed of this propeller shaft 5 is used as a value to represent the vehicle speed V.

The acceleration detector 2 also calculates an acceleration based on the time cycle PROD of the pulse signal.

A threshold value CLTPROD is set based on an acceleration that was found previously, and a predetermined acceleration or deceleration is detected by comparing the threshold value CLTPROD and the latest pulse cycle PROD.

Next, the processes performed by the acceleration detector 2 will be described referring to FIGS. 2 and 3.

Figure 2:
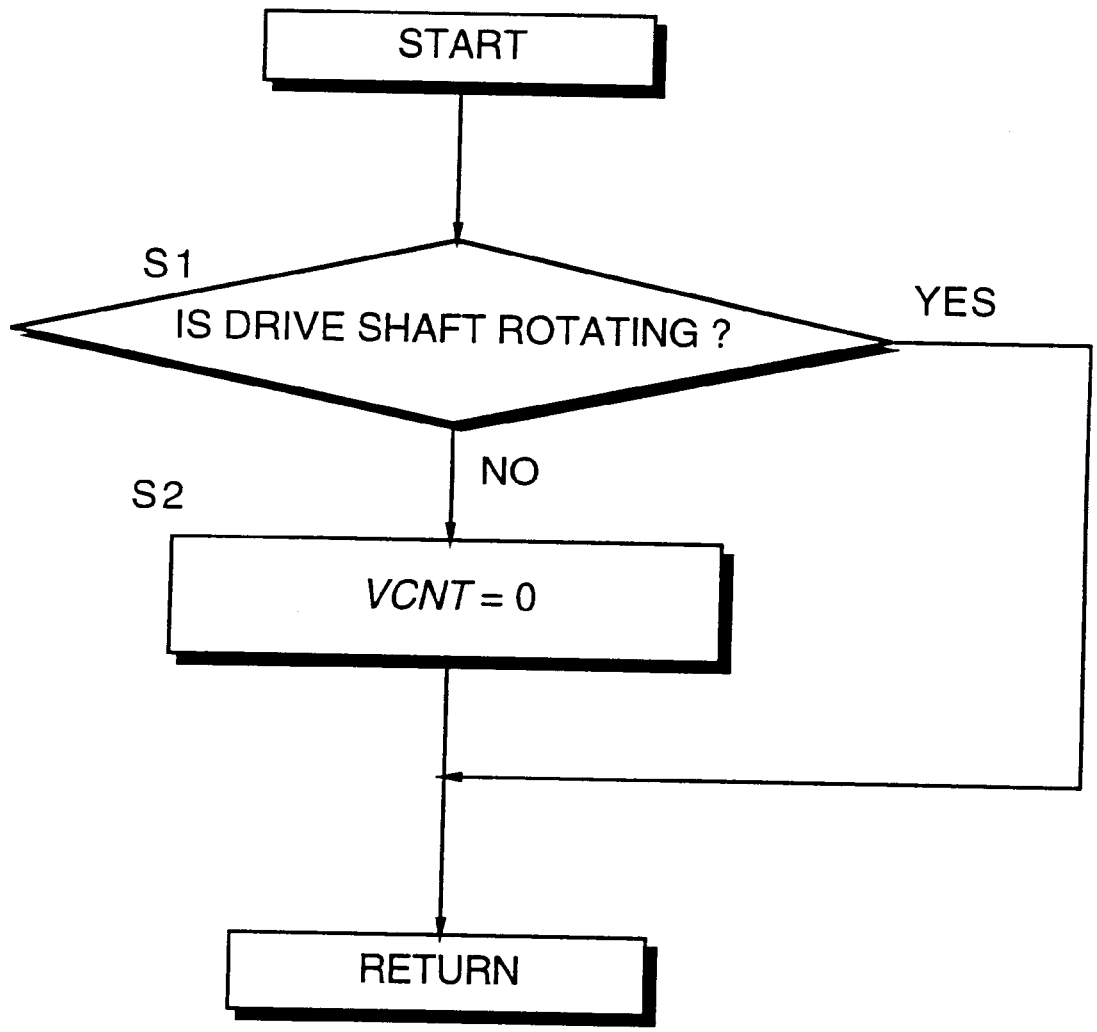
FIG. 2 is a flowchart describing a reset process of a pulse input flag performed by the acceleration detector.

The flowchart of FIG. 2 is executed repeatedly at a fixed or irregular short interval.

First, in a step S1, it is determined whether or not the drive shaft 5 is rotating.

If it is not rotating in a step S2, a pulse input flag VCNT is initialized to zero.

However, the state where the drive shaft 5 is not rotating means that the vehicle has a speed less than a minimum vehicle speed Vmin corresponding to the maximum value of the pulse cycle PROD which can be measured. Then, if the maximum value of the pulse cycle PROD is PRODmax, the minimum vehicle speed Vmin is given by the following equation (1).

$$V \min = \frac{K}{PROD \max} \quad (1)$$

where, $K$ = constant to be determined according to vehicle dimensions

In order to compute the pulse cycle PROD, two or more pulse signals must be input successively into the acceleration detector 2 from the vehicle speed sensor 3.

The pulse input flag VCNT is a flag showing whether a pulse signal was input into the acceleration detector 2. When the pulse input flag VCNT=0, it shows that a pulse has not yet been input since the vehicle started traveling. When VCNT=1, it shows that one or more pulses have already been input.

From the process of FIG. 2, the pulse input flag VCNT is reset to 0 every time the vehicle stops.

Figure 3:
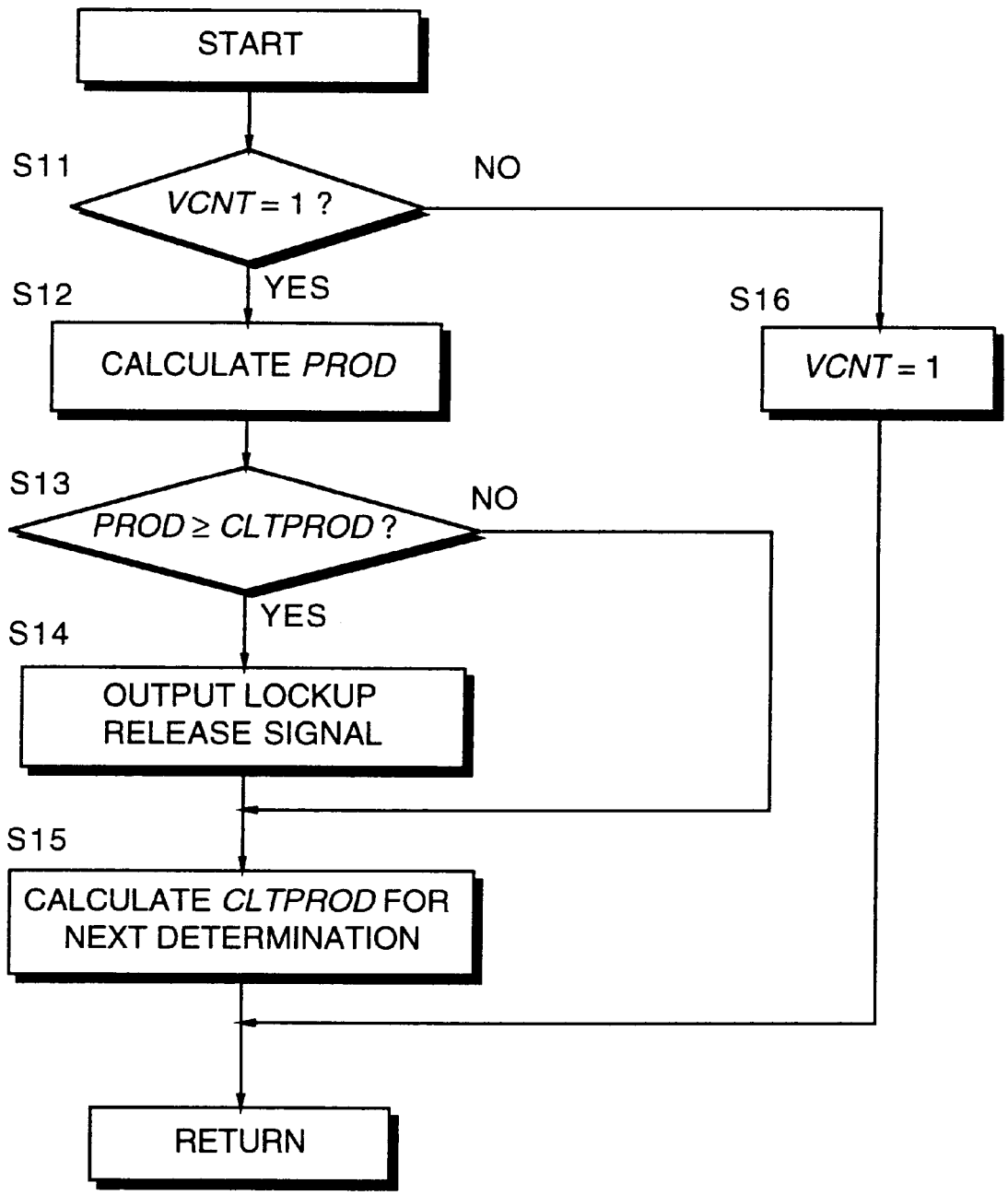
FIG. 3 is a flowchart describing a lockup clutch release process performed by the acceleration detector.

The flowchart of FIG. 3 is performed by the acceleration detector 2 each time a pulse signal is input fr om the vehicle speed sensor 3. When the acceleration detector 2 receives a pulse signal from the vehicle speed sensor 3, the receipt time is stored in a memory and the process of FIG. 3 is executed.

First, in a step S11, it is determined whether or not the pulse input flag VCNT is equal to 1.

When the pulse input flag VCNT is not 1, i.e., when a pulse signal is input for the first time, the pulse input flag VCNT is set to 1 in a step S16, and the process is terminated.

When in the step S11, the pulse input flag VCNT is 1, i.e., when a pulse signal has been received in the past, the process proceeds to a step S12.

In the step S12, the pulse cycle PROD is calculated from a difference between the receipt time of a pulse received in the past and the receipt time of a present pulse.

In a step S13, the pulse cycle PROD and the threshold value CLTPROD for determining the deceleration which was stored in memory, are compared.

In this comparison, if the pulse cycle PROD is equal to or greater than the threshold value CLTPROD, the process proceeds to a step S14.

In the step S14, a lockup release signal is output.

When the pulse cycle PROD is less than the threshold value CLTPROD, the step S14 is skipped and the process proceeds to a step S15.

In the step S15, the threshold value CLTPROD for the next deceleration determination is set by the following method.

The relation between the pulse interval of the vehicle speed sensor 3 and a rotation distance DP1 of the vehicle drive wheels can be expressed by the following equation (2):

$$Dp1 = \frac{r_t}{i_f \cdot P_s} \quad (2)$$

where, Ps=pulse number for one rotation of the vehicle speed sensor, $i_f$=rotation number of drive shaft 5 for one rotation of the drive wheels (=final gear ratio), and $r_t$=effective radius of tires.

Further, for a vehicle travel speed $V_0$, a pulse cycle tpl of the vehicle speed sensor 3 when the vehicle has decelerated at an acceleration $G_C$ is given by the following equations (3) and (4):

$$V_0 \cdot tp1 + \frac{1}{2} \cdot G_C \, tp1^2 = Dp1 \tag{3}$$

$$tp1 = \frac{-V_0 + \sqrt{V_0^2 + 2 \cdot G_c \cdot Dp1}}{G_c} \tag{4}$$

The acceleration or deceleration value to be detected is substituted for the acceleration $G_C$ in the above equations (3), (4), and the computed tpl is set to the threshold value CLTPROD. As the pulse period corresponds to the vehicle speed, a difference between the pulse period $PROD_{N-1}$ detected on the immediately preceding occasion and the pulse period $PROD_N$ detected in the present process corresponds to the acceleration $G_C$.

The value of the deceleration $G_C$ used to determine whether or not the lockup clutch 12A should be released, varies according to the vehicle speed V. Even for the same deceleration, the engine is less likely to stall when the vehicle speed V is large than when it is small. Therefore, as shown in FIG. 4A, the deceleration $G_C$ used for the determination is set larger the higher the vehicle speed $V_0$.

In this figure, lockup needs to be released in the upper area of the curve, and does not need to be removed in the lower area of the curve.

Figures 4A, 4B:
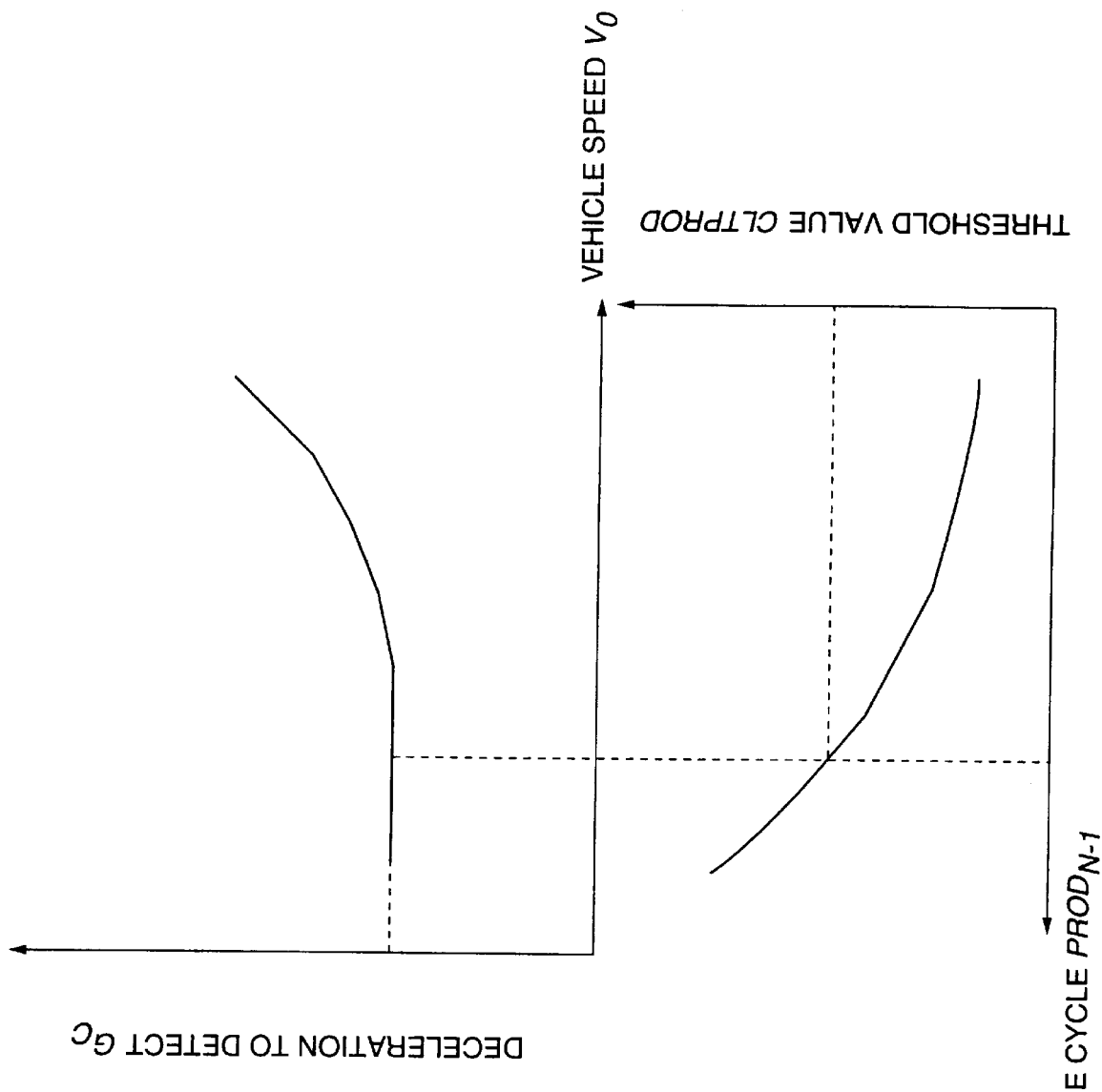
FIGS. 4A and 4B are diagrams showing a relation between specified deceleration, vehicle speed and a threshold value for deceleration determination according to this inventoion.

This relation is substituted in the above equation (4), and if the vehicle speed $V_0$ is represented by the pulse period $PROD_{N-1}$, the pulse period $PROD_{N-1}$ and threshold value CLTPROD have the relation shown in FIG. 4B. The calculated threshold value CLTPROD is smaller the shorter the pulse period $PROD_{N-1}$, i.e., the higher the vehicle speed $V_0$.

The acceleration detector 2 stores a map of contents shown in FIG. 4B beforehand, and the threshold value CLTPROD obtained by looking up a map from the pulse period $PROD_{N-1}$ on the immediately preceding occasion is stored in a memory. When the pulse cycle PROD is obtained in the present process, it is immediately compared with this threshold value CLTPROD, and when it is equal to or greater than the threshold value CLTPROD, the lockup clutch 12A is immediately released.

Therefore, according to this acceleration detector 2, it can be determined, in a very short time relative to the start of the pulse signal shown in FIG. 5A, whether or not a deceleration has been reached at which the lockup clutch 12A should be released. After this determination, the threshold value CLTPROD to be used in the next process cycle is calculated, and stored in memory.

On the other hand, in the case of the aforesaid prior art example where the deceleration is first calculated and then compared with a predetermined value, the determination result as to whether or not the deceleration has reached a value at which the lockup clutch 12A should be released is not known until the end of the process as shown in FIG. 5C. Consequently, a delay Δt occurs as compared with the case of this acceleration detector 2, as shown in FIG. 5C. Therefore the time required to determine whether or not the vehicle has reached a predetermined deceleration state can be shortened without having to improve the processing performance of the microprocessor used as the acceleration detector 2, and the engage/release operating response of the lockup clutch 12A due to the speed change controller 1 is also improved.

In the aforesaid embodiment, if plural maps having the contents shown in FIG. 4B are prepared according to the deceleration which it is desired to detect, any deceleration can be detected. For example, a deceleration can be specified according to road surface conditions. In this case, a map is selected according to the specified deceleration, and a determination is then made by looking up the selected map as to whether or not this deceleration state has been reached.

Figure 6:
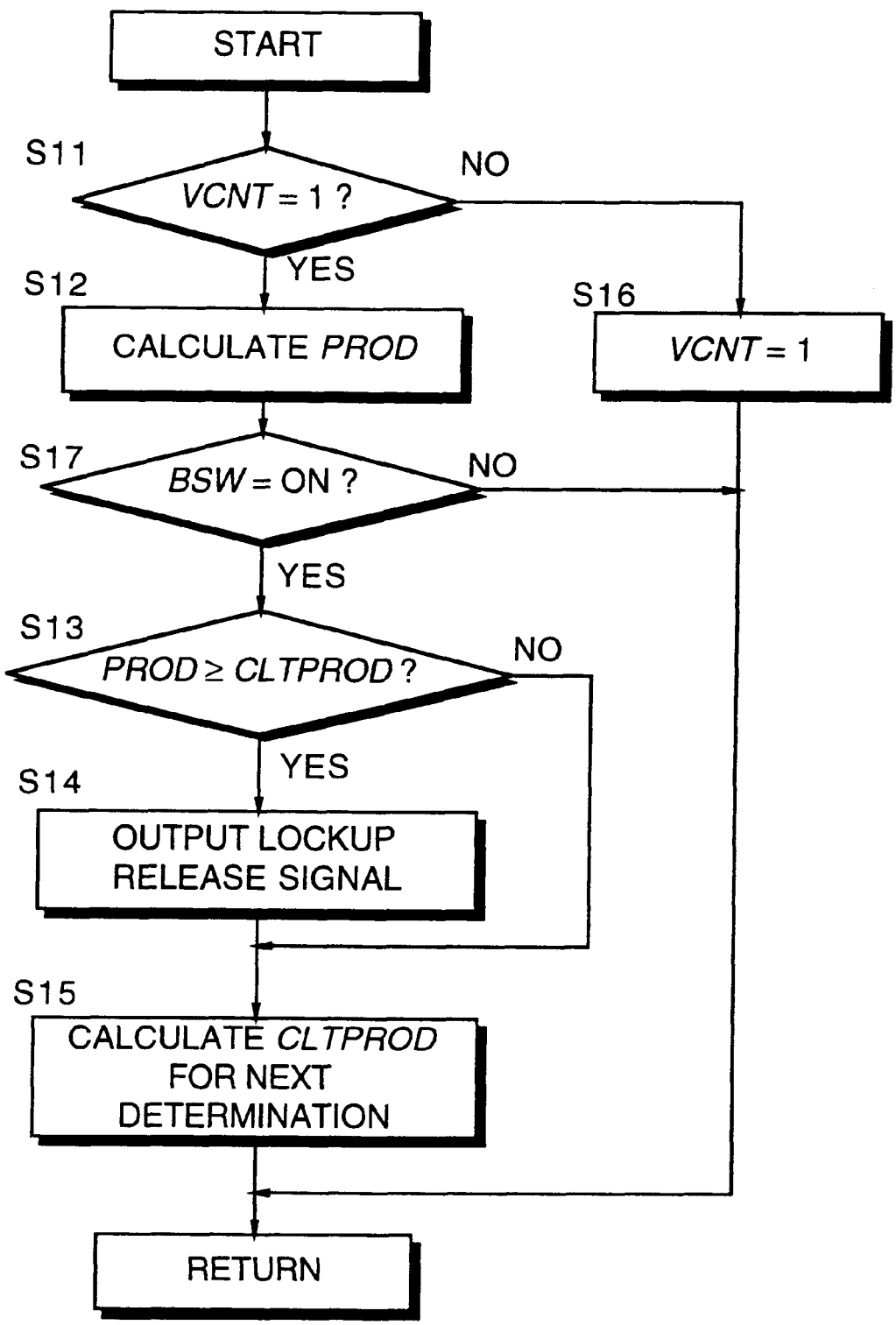
FIG. 6 is similar to FIG. 3, but showing a second embodiment of this invention.

Next, a second embodiment of this invention will be described referring to FIG. 6.

According to this embodiment, a step S17 for determining a brake signal BSW is added between the step S12 and S13 of the aforesaid first embodiment. For this purpose, a brake signal BSW from a brake switch 15 which detects the depression of a brake pedal of the vehicle is input. The brake signal turns ON when the brake pedal is depressed, and turns OFF when a driver releases his foot from the brake pedal.

In a step S17, it is determined whether or not the brake signal BSW is ON, and when it is ON, i.e., when the brake pedal is depressed, the processing of the step S13 and subsequent steps is performed. When the brake signal is OFF, the process is terminated without the processing of the steps S13–S15 being performed.

In general, the brake pedal is always depressed in the deceleration state when it is necessary to release the lockup clutch 12A. By adding the determination by the brake signal BSW, cases which do not require determination of acceleration/deceleration are eliminated beforehand.

Due to this construction, the calculation load on the acceleration detector 2 is reduced.

A third embodiment of this invention will now be described referring to FIGS. 7–8B. The flowchart of FIG. 7 corresponds to the flowchart of FIG. 2 of the aforesaid first embodiment.

In this embodiment, additional steps S21–S23 are provided after the step S2. In the step S21, it is determined whether or not the present vehicle speed V has exceeded the reference value $V_0$n. The vehicle speed V is less than the value $V_0$n immediately after the vehicle starts, so in this case the routine proceeds to the step S22.

In the step S22, the process of FIG. 3 of the aforesaid first embodiment is executed as a subroutine. Here, operation of the lockup clutch 12A on the basis of vehicle deceleration and calculation of the threshold value CLTPROD for executing the process on the following occasion is performed.

On the other hand, when the vehicle speed V exceeds the reference value $V_0$n in the step S21, execution of the subroutine is prohibited in the step S23, and the process is terminated.

The reference value $V_0$n used for comparison with the vehicle speed V in the step S21 is set as follows.

Figure 8A:
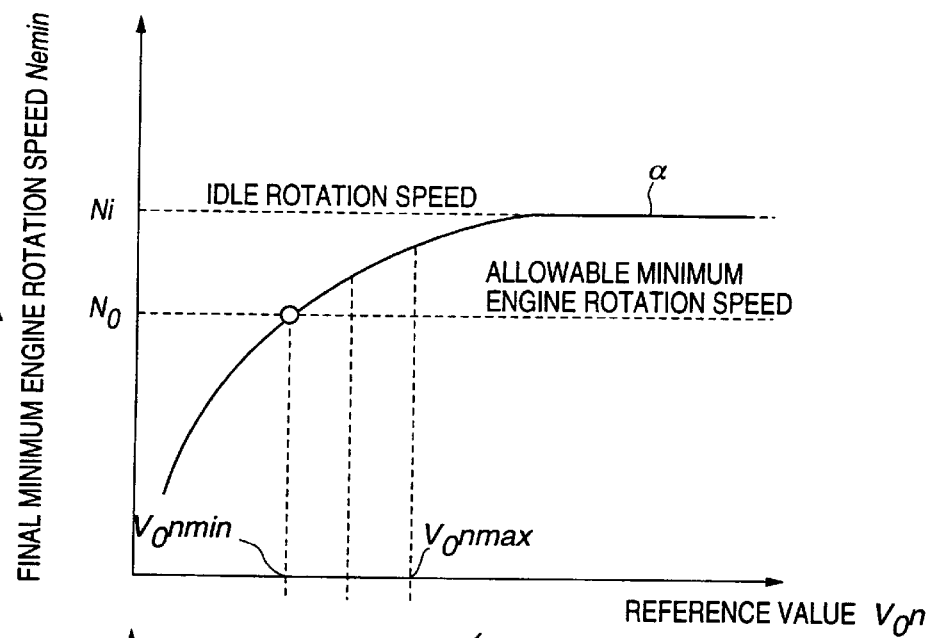
FIGS. 8A and 8B are diagrams describing a method of setting a reference value $V_0n$ according to the third embodiment.

A final minimum engine rotation speed Nemin which represents a level to which the engine rotation speed drops when the brakes are applied suddenly, can be expressed as a function of the vehicle speed V at a braking start point as shown in FIG. 8A. This relation is based on the conditions that the frictional coefficient is low and the lockup clutch is engaged.

When the final minimum engine rotation speed Nemin is less than an allowable minimum engine rotation speed $N_O$, the engine stalls. Assume that a vehicle speed when braking starts and the engine rotation speed has dropped to the allowable minimum engine rotation speed NO, is $V_0$nmin.

Figure 8B:
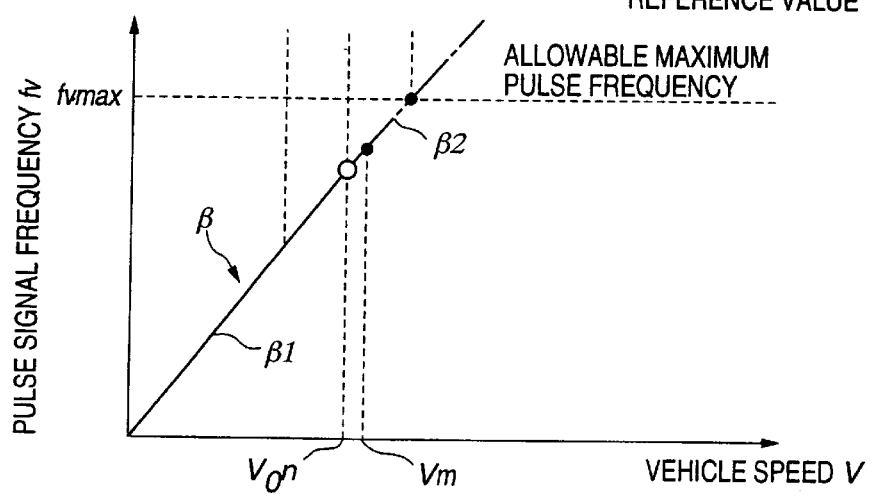

On the other hand, a frequency fV of the pulse signal output by the vehicle speed sensor 3 increases in linear proportion to the vehicle speed V, as shown by the line β in FIG. 8B. The limit of calculation of the accelerometer of the acceleration detector 2 is reached at an allowable maximum pulse frequency fVmax. Assume that the vehicle speed at this time is a speed $V_0$max. The reference value $V_0$n is a speed at which the engine rotation speed does not drop to the allowable minimum engine rotation speed $N_0$ when the brakes are applied suddenly, and it must also be a speed at which the acceleration detector 2 can perform the acceleration calculation. The reference value $V_0$n is therefore set between the minimum vehicle speed $V_0$nmin and the maximum vehicle speed $V_0$nmax.

When the reference value $V_0$n is set in this way, referring to FIG. 8B, the acceleration detector 2 detects the deceleration every time when the pulse signal is input, in an interval b1 in which the vehicle speed V does not reach the reference value $V_0$n.

In an interval b2 when the vehicle speed V exceeds the reference value $V_0$n, the routine of FIG. 3 is prohibited, so the calculation load on the acceleration detector 2 does not exceed the allowable limit.

In the interval b2, as shown in FIG. 8A, the engine rotation speed does not drop to the allowable minimum engine rotation speed $N_0$ even if the brakes are applied suddenly while the lockup clutch 12A is engaged, so there is no need to perform the lockup release process of FIG. 3.

Hence, the calculation of deceleration is not performed in the high vehicle speed region where there is no risk of the engine stalling, so calculation load on the acceleration detector 2 is suppressed, and the acceleration detector 2 can use a microprocessor of relatively low performance.

FIGS. 9–12B show a fourth embodiment of this invention.

Figure 10:
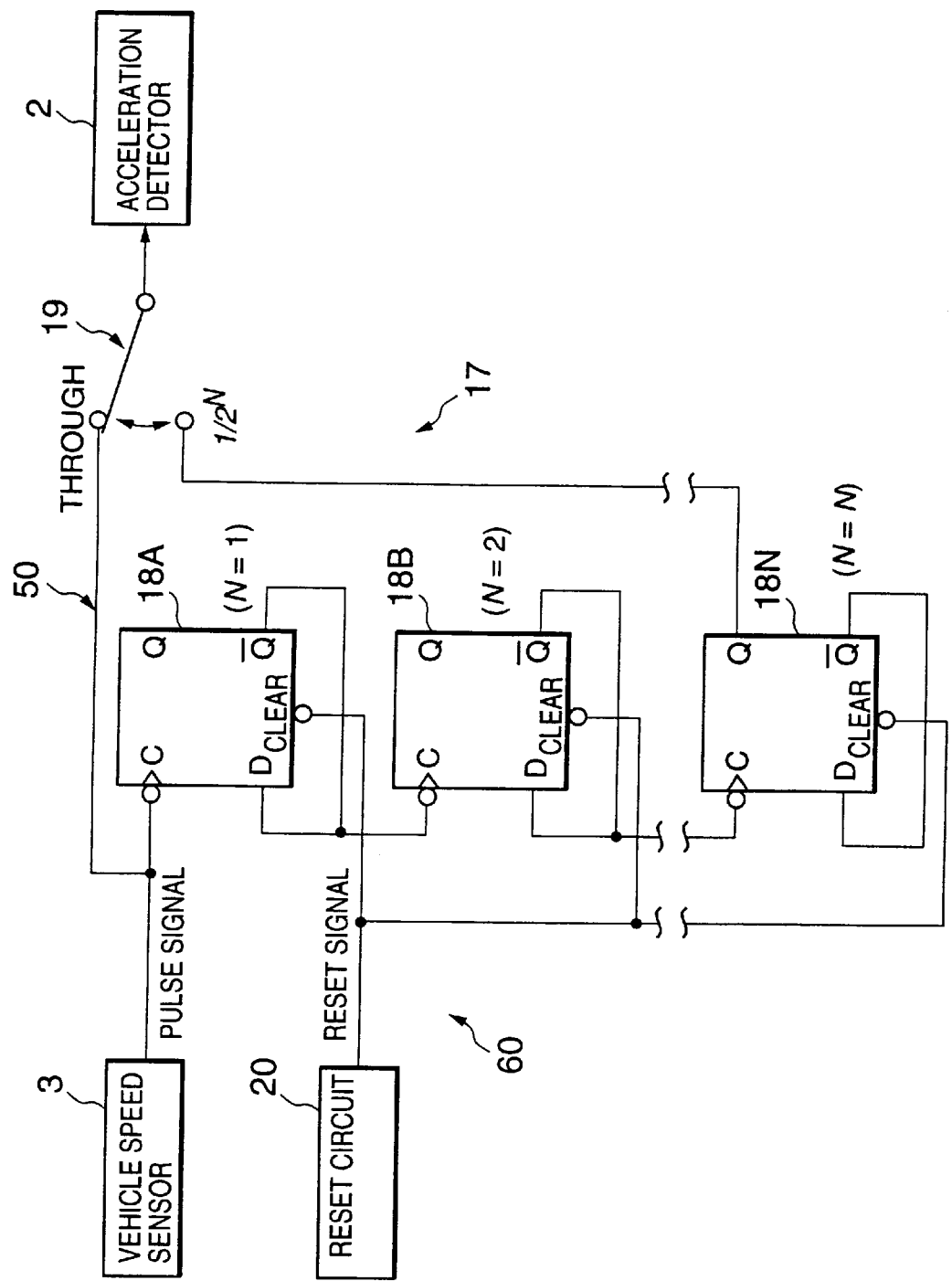
FIG. 10 is a circuit diagram of a frequency divider according to the fourth embodiment.

In this embodiment, a frequency divider 17 shown in FIG. 10 is provided between the vehicle speed sensor 3 and acceleration detector 2. The frequency divider 17 comprises a through circuit 50 which inputs a pulse signal $R_0$ directly into the acceleration detector 2, a divider circuit 60 comprising N flip-flop circuits 18A–8N, and a switch 19 which changes over between these circuits.

A reset circuit 20 for changing the division number N is attached to the divider circuit 60.

A pulse signal input from the vehicle speed sensor 3 is input into the acceleration detector 2 via the through circuit 50 or the divider circuit 60 according to the change-over of the switch 19.

Figure 7:
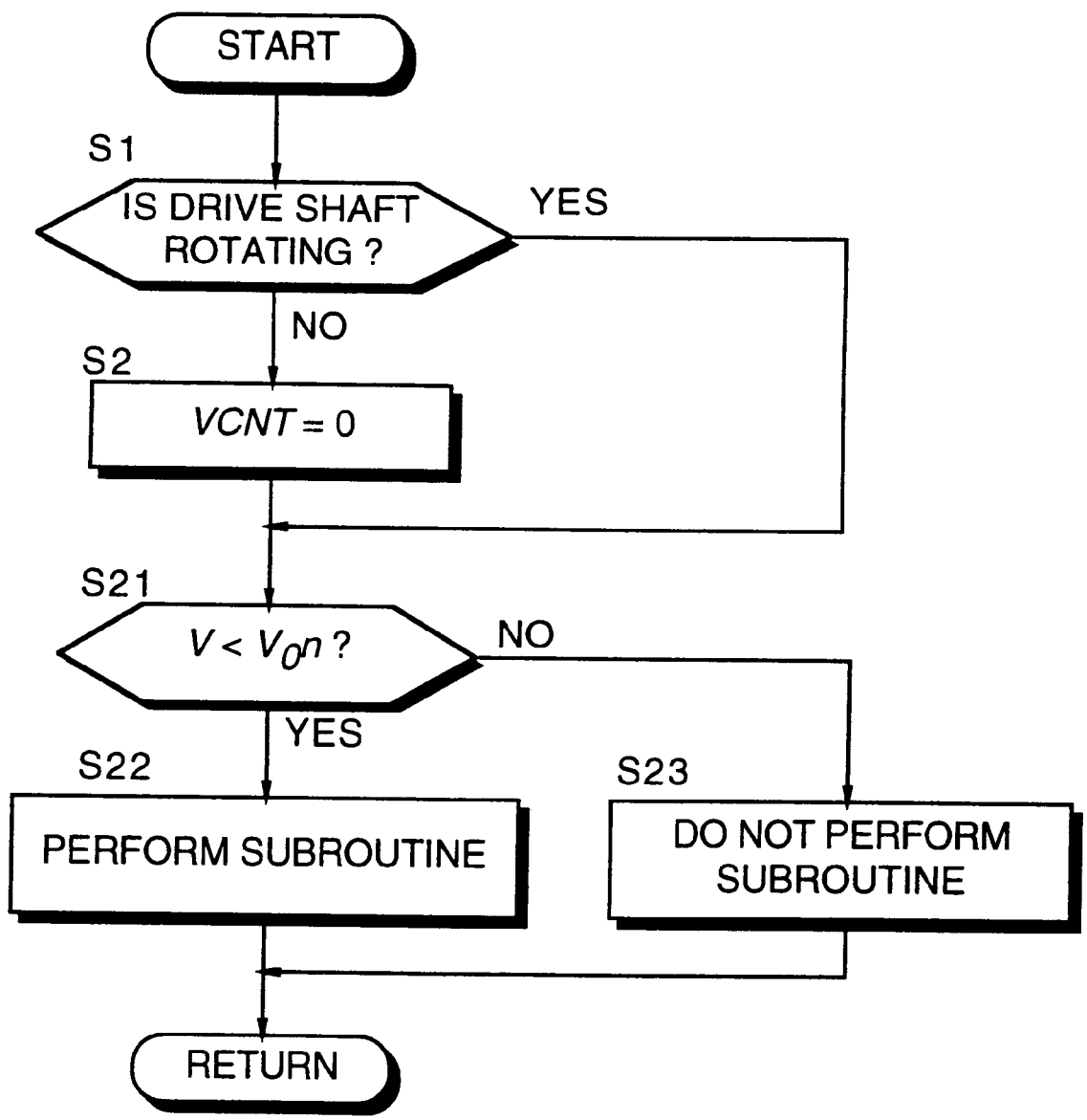
FIG. 7 is a flowchart describing a lockup clutch release process according to a third embodiment of this invention.
Figure 9:
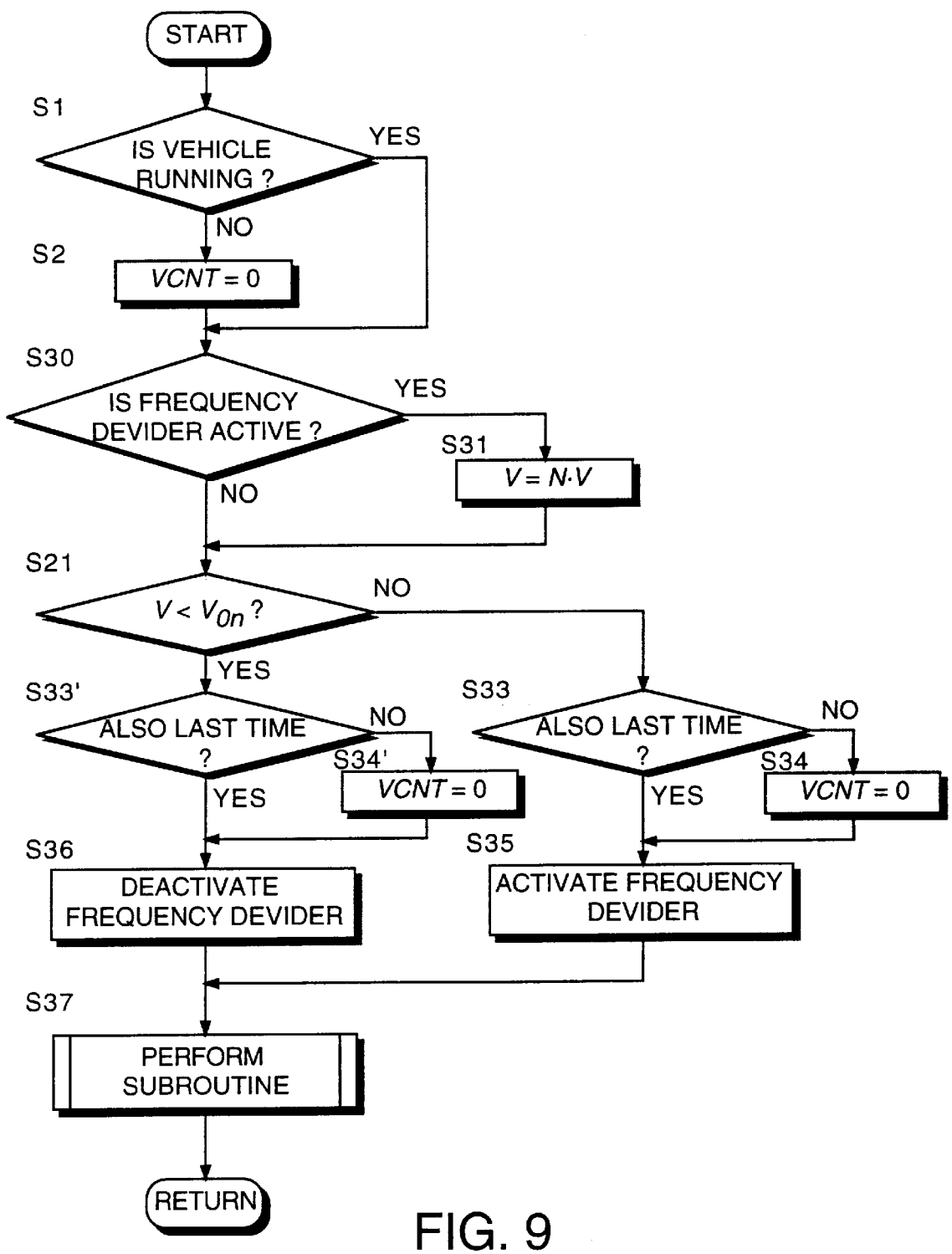
FIG. 9 is a flowchart describing a lockup clutch release process according to a fourth embodiment of this invention.

According to this embodiment, the process of FIG. 9 is executed instead of the process of FIG. 7 of the aforesaid third embodiment.

The process of FIG. 9 comprises steps S30, S31 interposed between the step S2 and step S32 of FIG. 7, and steps S33–S37, S33', S34' which are provided after the step S21.

In the step S30, it is determined whether or not the frequency divider 17 is active, i.e., whether or not the switch 19 has set the divider circuit 60 active.

When the divider circuit 60 is not active, i.e., when the through circuit 59 is used, the vehicle speed V is compared with the reference value $V_0$n in the step S21.

When the divider circuit 60 is active, i.e. when a pulse signal having a frequency corresponding to 1/N of the pulse signal equivalent to the vehicle speed V, is input into the acceleration detector 2. Therefore, in the step S31, an apparent vehicle speed is converted into a real vehicle speed by multiplying the vehicle speed by N based on the pulse signal.

When the vehicle speed V is less than the reference value $V_0$n in the step S21, it is determined in the step S33' whether or not the determination result is the same as on the immediately preceding occasion. If this is the first occasion when the vehicle speed V has become less than the reference value $V_0$n, a pulse input flag VCNT is reset to 0 in a step S34' and the routine proceeds to a step S35. If the same determination result is obtained as on the immediately preceding occasion, the step S34' is skipped and the routine proceeds to a step S36.

In a step S36, the divider circuit 60 is set non-active, i.e., a change-over is made to the through circuit 50. In a step S37, a subroutine corresponding to the process of FIG. 3 is executed as in the case of the aforesaid third embodiment, and the lockup clutch is engaged or released.

On the other hand when it was determined that the vehicle speed V is equal to or greater than the reference value $V_0$n in the S21, it is determined in the step S33 whether or not the determination result is the same as on the immediately preceding occasion. If this is the first occasion when the vehicle speed V has become equal to or greater than the reference value $V_0$n, a pulse input flag VCNT is reset to 0 in a step S34 and the routine proceeds to a step S35. If the same determination result is obtained as on the immediately preceding occasion, the step S34 is skipped and the routine proceeds to a step S35.

In the step S35, the divider 17 is set active, i.e., a change-over is made to the divider circuit 60.

In a step S7, a subroutine corresponding to the process of FIG. 3 is executed, and the lockup clutch is engaged or released.

According to the aforesaid process, the subroutine of FIG. 3 is not prohibited as in the aforesaid third embodiment even when the vehicle speed V is equal to or greater than the reference value $V_0$n, but the execution interval of the process is lengthened by multiplying the cycle of the pulse signal $R_0$ by N. Therefore, the calculation load on the acceleration detector 2 does not increase even in the high vehicle speed area.

The reason for providing the step S34 is because the output signal of the divider 17 largely varies around the change-over point of the switch 19. As a result, when it is determined in the step S33 that the vehicle speed is equal to or greater than the reference value $V_0$ for the first time, the pulse input flag VCNT is once cleared in the step S34. Due to this, in the subsequent step S37, no processing other than setting the pulse input flag VCNT to 1 in the step S16 is performed.

In this case, therefore, the lockup clutch operation and the calculation of the threshold value CLTPROD in the step S37 is performed only in the next and subsequent processes.

By providing the steps S33 and S34, determination of deceleration is performed without fail based on the pulse signal after division.

Figures 11A, 11B:
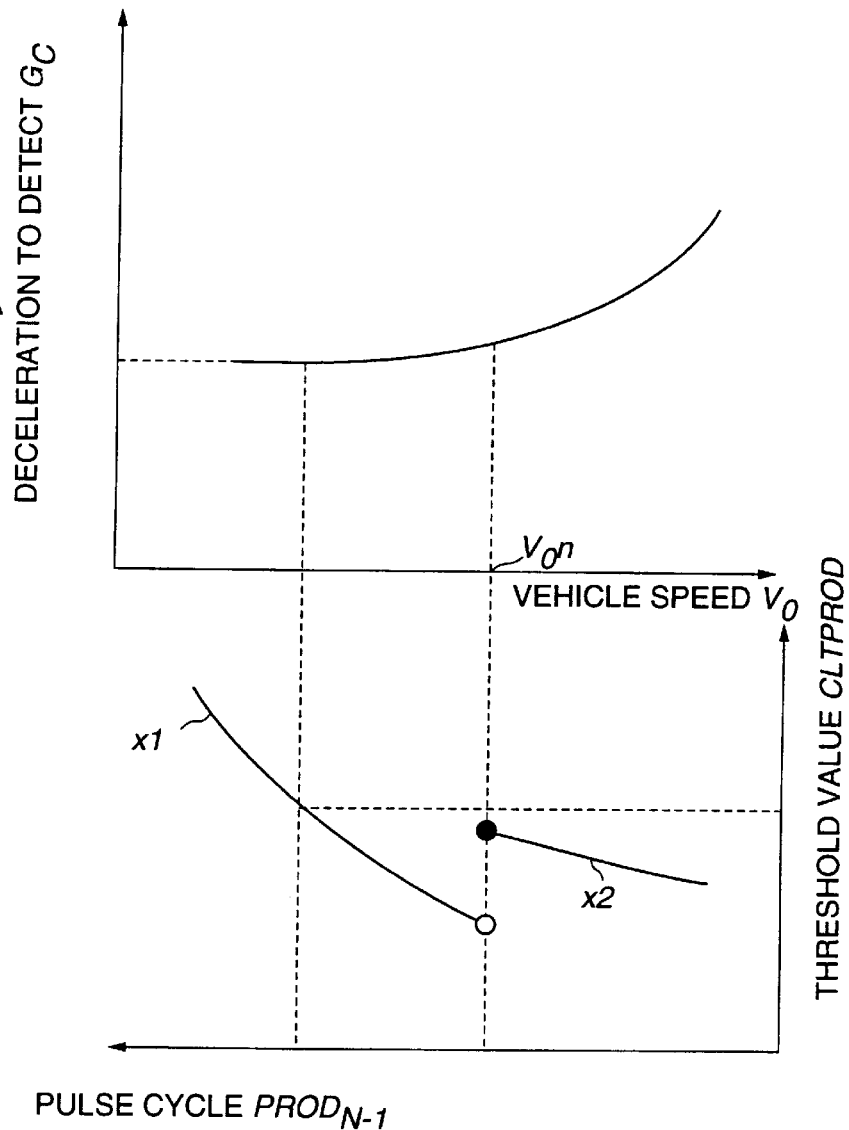
FIGS. 11A and 11B are diagrams showing a relation between specified deceleration, vehicle speed and a threshold value for deceleration determination according to the fourth embodiment.

Next, the determination of deceleration using the pulse signal after division according to this embodiment will be described referring to FIGS. 11A and 11B.

When the vehicle speed V becomes equal to or greater than the reference value $V_0$n, the cycle of the pulse signal is multiplied by N due to the change-over of the switch 19.

When the vehicle speed V is equal to or greater than the reference value $V_0$n, the threshold value CLTPROD with which the pulse period after division is compared, must be increased. FIG. 11A is similar to FIG. 4A, but in FIG. 11B, unlike FIG. 4B, the curves x1 and x2 are intermittent with a pulse period corresponding to the vehicle speed $V_0$n. This is because the switch 19 changes over at this point.

Next, the period of the pulse signal according to this embodiment will be described referring to FIGS. 12A–12B. FIG. 12A shows the pulse signal via the through circuit 50.

FIG. 12B shows the pulse signal divided by two by the flip-flop circuit 18A. FIG. 12C shows the pulse signal divided by four by the flip-flop circuit 18B. This divider 60 can set any division up to $\frac{1}{2}^N$ by the reset circuit 20. Therefore, the detection of vehicle speed V and deceleration can be performed in every speed region if the value of N is increased according to the rise of vehicle speed V.

Instead of detecting the pulse signal with the vehicle speed sensor 3, a sensor 16 which detects a real speed change ratio of the automatic transmission 10 and a crank angle sensor 13 may be connected to the acceleration detector 2 as shown in FIG. 1. In this case, the acceleration detector 2 generates a pulse signal according to the vehicle speed by dividing the pulse signal input from the crank angle sensor 13 by the real speed change ratio input from the sensor 16.

A fifth embodiment of this invention will now be described referring to FIGS. 13–16G.

Figure 13:
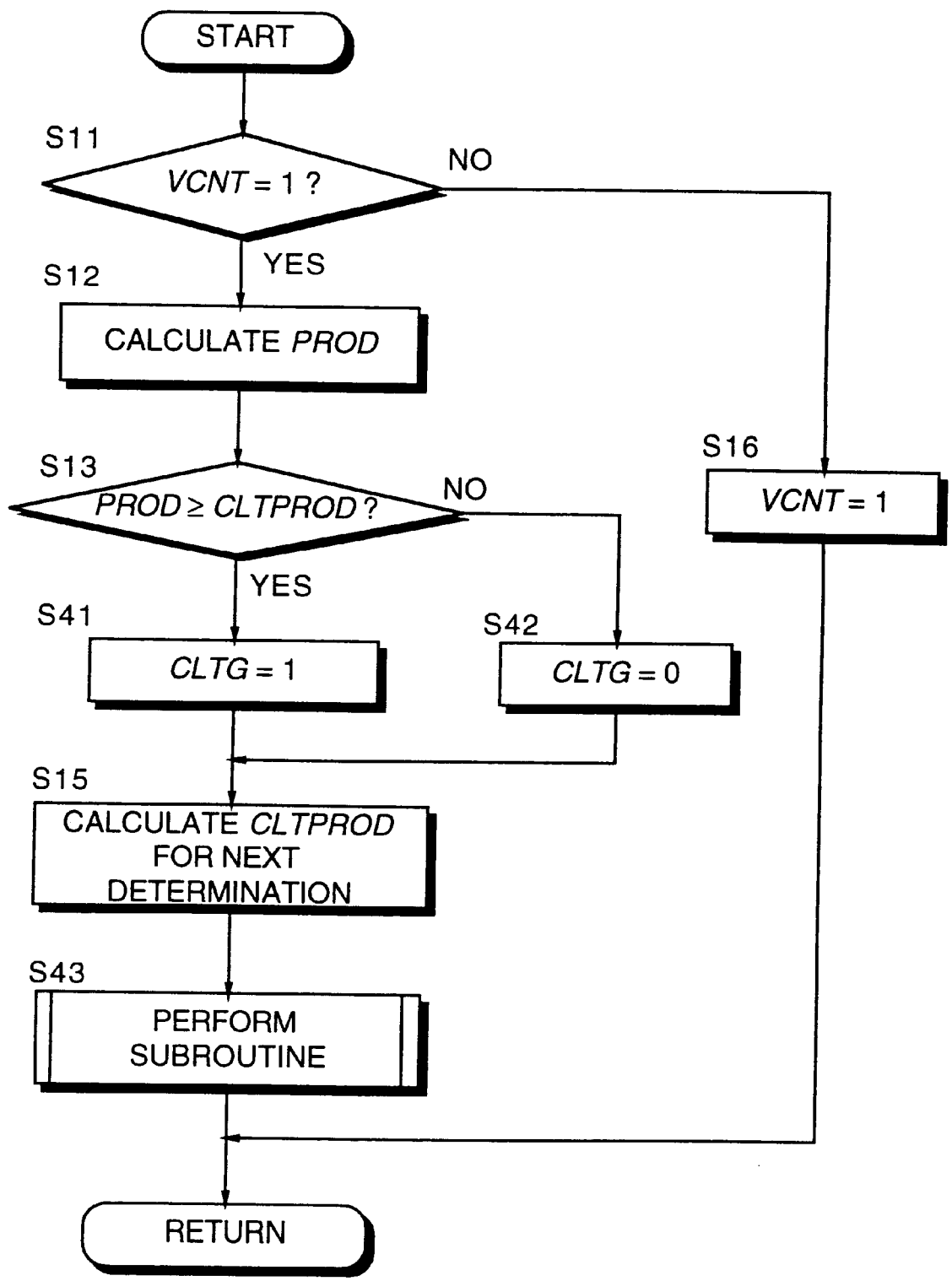
FIG. 13 is a flowchart describing a lockup clutch release process according to a fifth embodiment of this invention.
Figure 14:
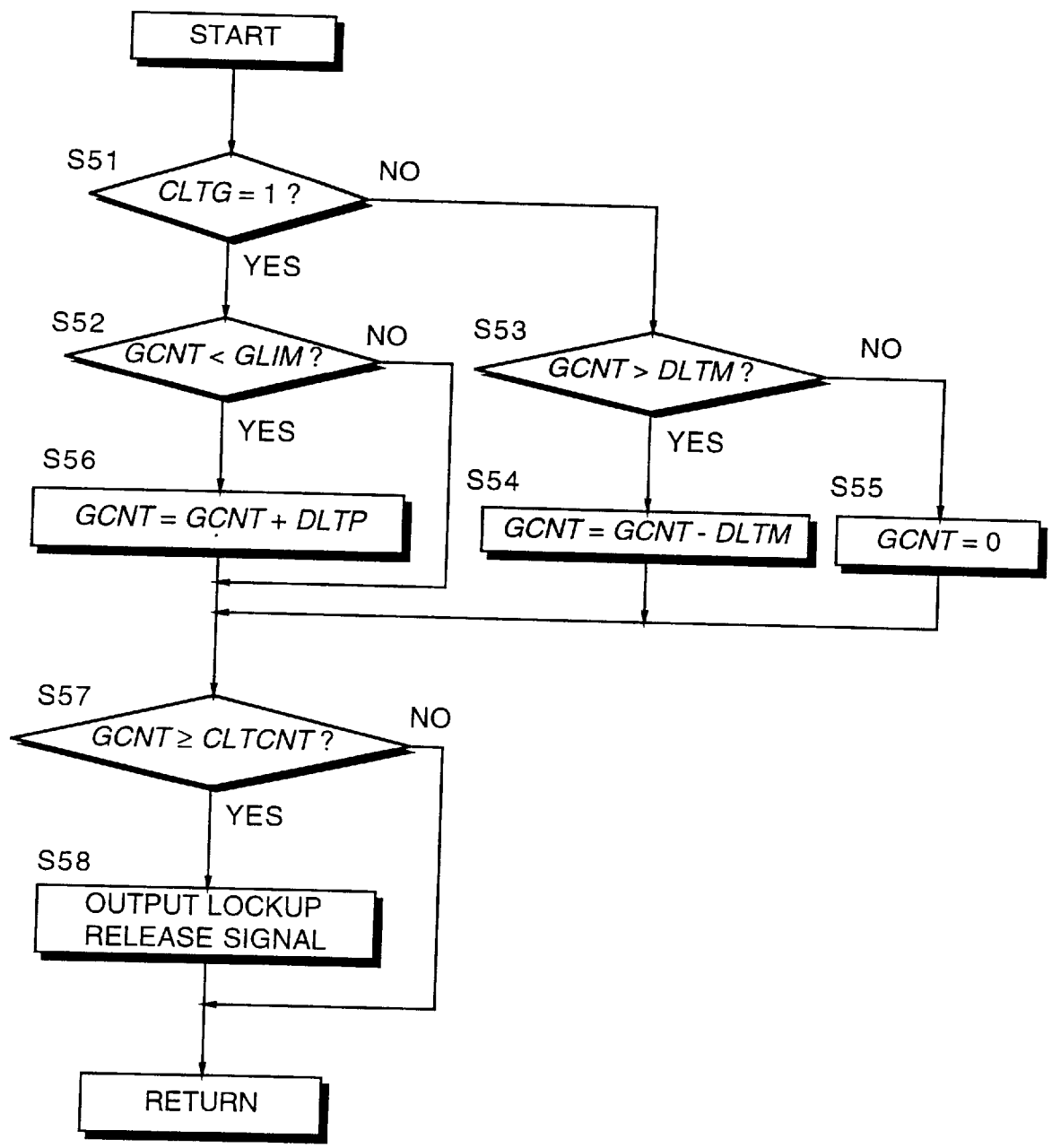
FIG. 14 is a flowchart describing the contents of a subroutine applied in the process of FIG. 13.

According to this embodiment, the process shown in FIG. 13 and FIG. 14 is executed instead of the process of FIG. 3 of the aforesaid first embodiment. Even if the pulse cycle PROD becomes equal to or greater than the threshold value CLTPROD, the lockup clutch 12A is not released immediately, and the lockup clutch 12A is released only after the same state has continued for a given period. A deceleration counter value $G_CNT$ is set for this purpose, the initial value of the deceleration counter value $G_CNT$ being set to 0.

In the process of FIG. 13, steps S41, S42 are provided instead of the step S14 of the process of FIG. 3, and a step S43 is provided after the step S15.

When the pulse cycle PROD is equal to or greater than the threshold value CLTPROD in the step S14, a deceleration flag CLTG is set to 1 in the step S41. When the pulse cycle PROD is less than the threshold value CLTPROD in the step S13, the deceleration flag CLTG is reset to 0 in the step S42.

When the deceleration flag CLTG is 1, it shows that a deceleration is performed which could possibly cause the engine to stall, and when the deceleration flag CLTG is 0, it shows that there is no risk of engine stall due to deceleration.

In the step S15, the threshold value CLTPROD for determining the deceleration on the next occasion is calculated as in the case of the aforesaid first embodiment.

In the step S43, the lockup clutch is operated by the subroutine shown in FIG. 14.

First, referring to FIG. 14, it is determined whether or not the deceleration flag CLTG is 1 in a step S51. When the deceleration flag CLTG is 1, the deceleration counter value $G_CNT$ is compared with a maximum counter value GLIM in the step S52. The maximum counter value GLIM is a value to regulate the upper limit of the deceleration counter value. When the deceleration counter value $G_CNT$ is less than the maximum counter value GLIM, a predetermined amount DLTP is added to the deceleration counter value $G_CNT$ in a step S56, and the routine proceeds to a step S57. When the deceleration counter value $G_CNT$ is equal to or greater than the predetermined value GLIM, the routine proceeds to the step S57.

On the other hand, when the deceleration flag CLTG is 0 in the step S51, i.e. when there is no possibility of engine stall, the routine proceeds to the step S53.

Here, the deceleration counter value $G_CNT$ is compared with the minimum counter value DLTM. The minimum counter value DLTM is a value which limits the lower limit of the deceleration counter value $G_CNT$. When the deceleration counter value $G_CNT$ is equal to or less than the minimum counter value DLTM in the step S53, the predetermined amount DLTM is subtracted from the deceleration counter value $G_CNT$ in the step S54, and the routine proceeds to the step S57. According to this embodiment, a predetermined amount is set equal to the minimum counter value DLTM.

When the deceleration counter value $G_CNT$ is less than or equal to the counter value DLTM, the deceleration counter $G_CNT$ is reset to 0 in the step S55, and the routine proceeds to the step S57.

In the step S57, the deceleration counter value $G_CNT$ is compared with the threshold value CLTCNT. When the deceleration counter value $G_CNT$ is equal to or greater than the threshold value CLTCNT, the lockup clutch 12A is then released in a step S58. When the deceleration counter value $G_CNT$ is less than the threshold value CLTCNT, the process is terminated without releasing the lockup clutch 12A.

When for example the vehicle speed V decreases as shown in FIG. 15A and the pulse cycle PROD of the pulse signal $R_0$ becomes longer accordingly, under the aforesaid process, the pulse period PROD exceeds the threshold value CLTPROD at the point α in FIG. 15C for example, and the deceleration flag CLTG changes from 0 to 1 simultaneously. As a result, addition to the deceleration counter value $G_CNT$ shown in FIG. 15D is started.

When the deceleration counter value $G_CNT$ reaches the threshold value CLTCNT at the point β, the lockup clutch 12A is released as shown in FIG. 15E. Specifically, even when the pulse cycle PROD becomes equal to or greater than the threshold value CLTPROD, the lockup clutch 12A is not immediately released. It is released at a time point when the deceleration counter value $G_CNT$ reaches the threshold value CLTCNT.

Next, referring to FIGS. 16A–16G, the above-mentioned lockup clutch control will be described when the vehicle travels over a convex part of the road surface.

On a road surface with a convex part as shown in FIG. 16A, the vehicle speed V changes in a short time as shown in FIG. 16B, and a large deceleration is temporarily detected as a result.

According to this embodiment, the deceleration flag CLTG temporarily changes from 0 to 1 as shown in FIG. 16D, and a predetermined amount DLTP is added to the deceleration counter value $G_CNT$ which was maintained at a constant value as shown in FIG. 16E.

However, as this large deceleration does not continue, the deceleration counter value $G_CNT$ does not reach the threshold value CLTCNT, and the lockup clutch 12A remains engaged as shown in FIG. 16F. When the vehicle wheels run over a convex part of the road, the vehicle speed V temporarily rises, the deceleration flag CLTG is reset to 0, and the predetermined amount DLTM is subtracted from the deceleration counter value $G_CNT$. Then, when the vehicle speed stabilizes, the deceleration counter value $G_CNT$ also becomes constant.

On the other hand, according to the first embodiment, as the lockup clutch 12A is immediately released when the pulse cycle PROD reaches the threshold value CLTPROD, release of the lockup clutch 12A occurs as shown in FIG. 16G even when the vehicle runs over a convex part of the road as shown in FIG. 16A.

Hence according to the fifth embodiment as above, the noise component due to unevenness of the road surface is removed from the fluctuation of the pulse signal period of the vehicle speed sensor, so unnecessary release of the lockup clutch when the vehicle travels over an uneven surface is prevented.

To enhance the noise removal function, it is desirable that the relation between DLTP and DLTM is DLTP<DLTM.

According to this embodiment, when the pulse cycle PROD is equal to or greater than the threshold value CLTPROD, the predetermined value DLTP is added to the deceleration counter value G$_C$NT, and when the pulse period PROD is less than the threshold value CLTPROD, the predetermined value DLTM is subtracted from the deceleration counter value G$_C$NT.

However, the predetermined value DLTP may also be subtracted from the deceleration counter value G$_C$NT when the pulse cycle PROD is equal to or greater than the threshold value CLTPROD, and the predetermined value DLTP may also be added to the deceleration counter value G$_C$NT when the pulse cycle PROD is less than the threshold value CLTPROD. However in this case, the lockup clutch is released when the deceleration counter value G$_C$NT becomes equal to or less than the threshold value CLTCNT.

The threshold value CLTPROD may be calculated by the following equations (5), (6).

$$CLTPROD = \frac{-V_0^2 + \sqrt{V_0 + 2 \cdot G_C \cdot Dp1}}{G_C} \quad (5)$$

$$V_0 = \frac{K \cdot Dp1}{t_0} \quad (6)$$

where, DP1=rotation distance of drive wheels 5 corresponding to pulse cycle of vehicle speed sensor 3, $t_0$=latest pulse cycle of vehicle speed sensor 3, $V_0$=latest vehicle speed, $G_C$=specified acceleration which it is intended to detect, and K=positive integer.

In the aforesaid embodiments, a specified deceleration of the vehicle was detected, but an acceleration may also be determined using the acceleration detector 2. In this case, when the pulse period PROD is less than the threshold value CLTPROD, it is determined that the acceleration of the vehicle has reached a predetermined acceleration.

The acceleration detector 2 is not limited to determining release of the lockup clutch 12A, and it may be applied also to traction control devices or drive force distribution devices of four wheel drive vehicles which perform control based on a predetermined acceleration or deceleration.

The embodiments of this invention in which an exclusive property or privilege is claimed are defined as follows:

What is claimed:

1. A vehicle acceleration detector comprising:
    a vehicle speed sensor which periodically generates a pulse signal corresponding to a vehicle speed, so as to result in a plurality of pulse signals being generated, and
    a microprocessor programmed to
        calculate a threshold value corresponding to a subsequent cycle of said plurality of pulse signals based on a latest cycle of said plurality of pulse signals and a specified acceleration, and
        perform a determination as to whether or not a vehicle acceleration has reached the specified acceleration based on a comparison of said threshold value and a subsequent cycle of said plurality of pulse signals detected on a subsequent occasion.

2. An acceleration detector as defined in claim 1, wherein said vehicle comprises a drive wheel, and said microprocessor is further programmed to convert the cycle of said latest pulse signal to a travel distance of said drive wheel, and calculate said threshold value from said travel distance and said specified acceleration.

3. An acceleration detector as defined in claim 2, wherein said microprocessor comprises a map specifying a relation between the cycle of said pulse signals and said threshold value, and is further programmed to calculate said threshold value by referring to said map based on the cycle of said latest pulse signal.

4. An acceleration detector as defined in claim 3, wherein said microprocessor comprises a plurality of said maps set according to said specified acceleration, and is further programmed to change over a map used for calculating said threshold value according to said specified acceleration.

5. An acceleration detector as defined in claim 1, wherein said detector further comprises a device for detecting whether or not a vehicle brake is operating, and said microprocessor is further programmed not to perform said determination when said vehicle brake is not operating.

6. An acceleration detector as defined in claim 1, wherein the microprocessor performs the calculate step and the perform step only when the vehicle speed is less than a threshold speed value.

7. A vehicle acceleration detector comprising:
    a vehicle speed sensor for detecting a vehicle speed, said sensor periodically generating a pulse signal representative of said vehicle speed, said periodic generating of said pulse signal resulting in a plurality of pulse signals being generated, and
    a microprocessor programmed to:
        perform a first determination as to whether or not a vehicle acceleration has reached a specified acceleration based on a cycle of said plurality of pulse signals,
        perform a second determination as to whether or not said vehicle speed is larger than a predetermined value, and
        refrain from performing said first determination based on specified pulse signal of said plurality of pulse signals when said vehicle speed exceeds said predetermined value.

8. An acceleration dector as defined in claim 7, wherein said specified pulse signal corresponds to all the pulse signals generated by said vehicle speed sensor.

9. An acceleration detector as defined in claim 7, wherein said microprocessor is further programmed to divide a frequency of said plurality of pulse signals by a predetermined division number, and to set a pulse signal excluded by division to said specific pulse signal.

10. An acceleration detector as defined in claim 9, wherein said microprocessor is further programmed to increase said division number as said vehicle speed increases.

11. An acceleration detector as defined in claim 7, wherein said vehicle comprises a propeller shaft, and said vehicle speed sensor comprises a sensor for generating a pulse signal having a fixed relation with a rotation speed of said propeller shaft.

12. An acceleration detector as defined in claim 7, wherein said vehicle comprises an engine and a transmission joined to said engine, said vehicle speed sensor comprises a crank angle sensor for generating a pulse signal having a fixed relation with a rotation angle of said engine and a sensor for detecting a real speed change ratio of said transmission, and said microprocessor is further programmed to generate said pulse signal representative of said vehicle speed by dividing the pulse signal of said crank angle sensor by said real speed change ratio.

13. A vehicle acceleration detector comprising:
    a vehicle speed sensor which periodically generates a pulse signal corresponding to a vehicle speed, said periodic generating of said pulse signal resulting in a plurality of pulse signals being generated, and a microprocessor programmed to:

set a predetermined counter value, determine whether or not an instantaneous acceleration of said vehicle corresponding to an initial cycle time has reached a specified acceleration based on a cycle of said plurality of pulse signals, add a first predetermined amount to said counter value when the instantaneous acceleration of said vehicle has reached said specified acceleration, subtract a second predetermined amount from said counter value when the instantaneous acceleration of said vehicle has not reached said specified acceleration, and perform a determination as to whether or not a vehicle acceleration has reached said specified acceleration, when said counter value is equal to or greater than a predetermined upper limit.

14. An acceleration detector as defined in claim 13, wherein both of said first predetermined amount and said second predetermined amount are set to negative values, and said microprocessor performs the determination only when said counter value is equal to or smaller than a predetermined lower limit.

15. An acceleration detector as defined in claim 13, wherein said microprocessor is further programmed to calculate a threshold value corresponding to a subsequent cycle of said pulse signals based on a latest period of said pulse signals and said specific acceleration, and to determine whether or not the acceleration of said vehicle has reached said specified acceleration based on a comparison of said threshold value and the cycle of the pulse detected on a subsequent occasion.

16. An acceleration detector as defined in claim 15, wherein said vehicle comprises drive wheels and said microprocessor is further programmed to calculate said threshold value by the following equation:

$$CLTPROD = \frac{-V_0^2 + \sqrt{V_0 + 2 \cdot G_C \cdot Dp1}}{G_C}$$

$$V_0 = \frac{K \cdot Dp1}{t_0}$$

where, CLTPROD=threshold value,

DP1=rotation distance of drive wheels 5 corresponding to pulse cycle of vehicle speed sensor 3, $t_0$=latest pulse cycle of vehicle speed sensor 3, $V_0$=latest vehicle speed, $G_C$=specific acceleration which it is intended to detect, and K=positive integer.

17. An acceleration detector as defined in claim 13, wherein both said first predetermined amount and second predetermined amount are set to positive values, and said first predetermined amount is set less than said second predetermined amount.

18. An acceleration detector as deined in claim 13, wherein the microprocessor performs the steps a) through e) only when the vehicle speed is less than a threshold speed value.

* * * * *